United States Patent
Turner et al.

(10) Patent No.: US 9,796,226 B2
(45) Date of Patent: Oct. 24, 2017

(54) SYSTEMS AND METHODS FOR MOVABLE HITCH RECEIVER

(71) Applicant: GM GLOBAL TECHNOLOGY OPERATIONS LLC, Detroit, MI (US)

(72) Inventors: Phillip M. Turner, Montrose, MI (US); Richard O. Gillett, Jr., Corunna, MI (US); Stephen R. Pastor, Farmington Hills, MI (US); Thomas A. Klingler, Lake Orion, MI (US); Xiaofeng Mao, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 46 days.

(21) Appl. No.: 14/585,552

(22) Filed: Dec. 30, 2014

(65) Prior Publication Data

US 2016/0187888 A1    Jun. 30, 2016

(51) Int. Cl.
| | |
|---|---|
| *B60D 1/24* | (2006.01) |
| *B60D 1/44* | (2006.01) |
| *B60D 1/36* | (2006.01) |
| *B60D 1/62* | (2006.01) |

(52) U.S. Cl.
CPC ............... *B60D 1/246* (2013.01); *B60D 1/36* (2013.01); *B60D 1/44* (2013.01); *B60D 1/62* (2013.01)

(58) Field of Classification Search
CPC ... G05D 3/10; B60D 1/36; B60D 1/44; B60D 1/62; B60D 1/256
See application file for complete search history.

(56) References Cited

U.S. PATENT DOCUMENTS

| | | | | |
|---|---|---|---|---|
| 4,153,132 A | * | 5/1979 | Biedebach | B62D 13/00 180/420 |
| 4,575,110 A | | 3/1986 | Kuhn et al. | |
| 6,634,666 B2 | * | 10/2003 | Shilitz | B60D 1/44 280/470 |
| 7,036,626 B2 | | 5/2006 | Niessen et al. | |
| 8,091,913 B1 | * | 1/2012 | White | B60D 1/06 280/456.1 |
| 8,678,421 B1 | * | 3/2014 | Williams, Jr. | B60D 1/246 280/479.1 |

(Continued)

FOREIGN PATENT DOCUMENTS

DE    3318929 A1    11/1984

OTHER PUBLICATIONS

"PullRite—Worry-free Travel Trailer Towing," accessed on Dec. 30, 2014 from http://www.pullrite.com/products/pullrite-worry-free-travel-trailer-towing, pp. 1-2.

(Continued)

*Primary Examiner* — Redhwan K Mawari
*Assistant Examiner* — Michael Whalen
(74) *Attorney, Agent, or Firm* — Lorenz & Kopf, LLP

(57) ABSTRACT

Methods and apparatus are provided for moving a receiver associated with a hitch frame of a vehicle. The method includes receiving data indicating a hand wheel angle; determining, with a processor, a position for the receiver relative to the hitch frame based on the hand wheel angle; and outputting one or more control signals to a motor coupled to the receiver to move the receiver relative to a longitudinal axis of the vehicle based on the determination.

11 Claims, 7 Drawing Sheets

(56) References Cited

U.S. PATENT DOCUMENTS

| | | | | |
|---|---|---|---|---|
| 2003/0137126 A1* | 7/2003 | Reuter | ................... | B60D 1/246 |
| | | | | 280/479.1 |
| 2004/0021291 A1* | 2/2004 | Haug | ...................... | B60D 1/30 |
| | | | | 280/455.1 |
| 2004/0021292 A1* | 2/2004 | Abair | .................... | B60D 1/246 |
| | | | | 280/456.1 |
| 2004/0124605 A1 | 7/2004 | McClure et al. | | |
| 2006/0282205 A1* | 12/2006 | Lange | ................... | G01C 21/20 |
| | | | | 701/50 |
| 2011/0018231 A1 | 1/2011 | Collenberg | | |

OTHER PUBLICATIONS

State Intellectual Property Office of the People's Republic of China, Office Action in Chinese Patent Application No. 201511011144.8 dated Aug. 1, 2017.

\* cited by examiner

SYSTEMS AND METHODS FOR MOVABLE HITCH RECEIVER

TECHNICAL FIELD

The present disclosure generally relates to vehicles and more particularly relates to systems and methods for a movable hitch receiver for a motor vehicle.

BACKGROUND

Certain motor vehicles include a hitch receiver to enable the vehicle to tow a trailer, for example. Generally, the hitch receiver is in a fixed location on the vehicle, and thus, for many vehicle operators, multiple attempts must be made to properly align the hitch receiver with a tongue on the trailer. This can be frustrating and time consuming.

Accordingly, it is desirable to provide improved systems and methods for a hitch receiver, such as a movable hitch receiver. Furthermore, other desirable features and characteristics of the present invention will become apparent from the subsequent detailed description and the appended claims, taken in conjunction with the accompanying drawings and the foregoing technical field and background.

SUMMARY

In one embodiment, a method is provided for moving a receiver associated with a hitch frame of a vehicle. The method includes receiving data indicating a hand wheel angle; determining, with a processor, a position for the receiver relative to the hitch frame based on the hand wheel angle; and outputting one or more control signals to a motor coupled to the receiver to move the receiver relative to a longitudinal axis of the vehicle based on the determination.

In one embodiment, a movable hitch system is provided. The movable hitch system includes a hitch frame for coupling to a vehicle and a receiver movably coupled to the hitch frame so as to be movable relative to an axis. The receiver has a ball for coupling with a trailer. The movable hitch system includes a motor coupled to the hitch frame having an output shaft coupled to the receiver to move the receiver relative to the axis and a control module that outputs one or more control signals to the motor to move the receiver.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of movable hitch systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
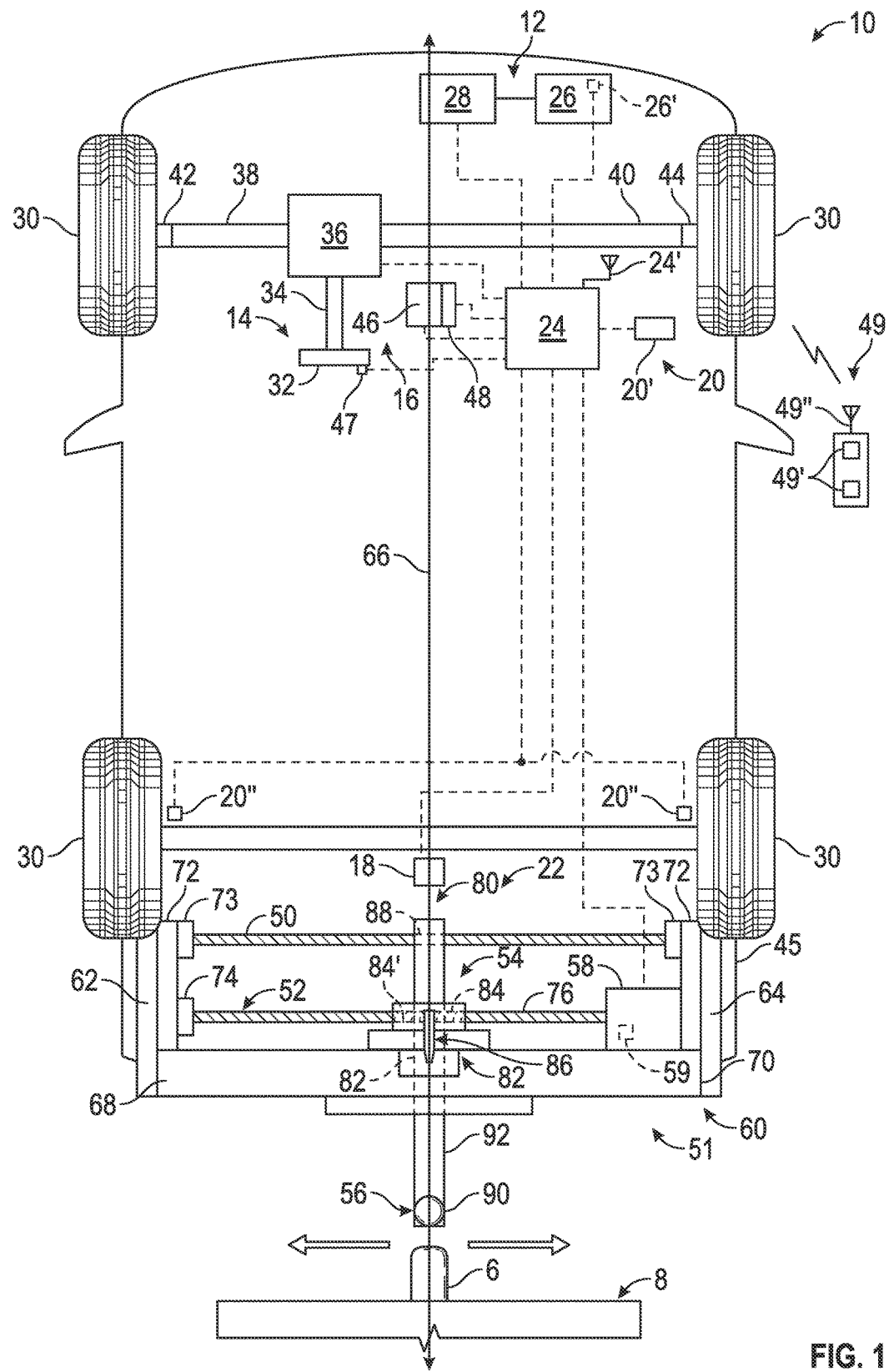
FIG. 1 is a functional block diagram illustrating a vehicle that includes a movable hitch receiver system in accordance with various embodiments.

With reference to FIG. 1, a vehicle 10 is shown. The vehicle 10 includes a powertrain 12, a steering system 14, a driver communication system 16, a camera 18, one or more sensors 20, a movable hitch system 22, and a control module 24 in accordance with various embodiments. As will be discussed further herein, the movable hitch system 22 enables the vehicle 10 to be coupled to a tongue 6 of a trailer 8 so that the vehicle 10 can tow the trailer 8. Although the figures shown herein depict an example with certain arrangements of elements, additional intervening elements, devices, features, or components may be present in an actual embodiment. It should also be understood that FIG. 1 is merely illustrative and may not be drawn to scale.

The powertrain 12 includes a propulsion device, such as an engine 26, which supplies power to a transmission 28. In one example, the engine is an internal combustion engine, which includes an engine control module 26'. The engine control module 26' receives one or more control signals from the control module 24 to adjust a throttle associated with the engine 26. It should be noted that the use of an internal combustion engine is merely exemplary, as the propulsion device can be a fuel cell, electric motor, etc. The transmission 28 transfers this power to a suitable driveline coupled to one or more wheels 30 (and tires) of the vehicle 10 to enable the vehicle 10 to move. As is known to one skilled in the art, the transmission 28 can comprise a suitable gear transmission, which can be operated in a variety of ranges containing one or more gears, including, but not limited to a park range, a neutral range, a reverse range, a drive range, etc. The current range of the transmission is communicated or transmitted to the control module 24 through a suitable communication architecture or arrangement that facilitates transfer of data, commands, power, etc.

Generally, the steering system 14 includes a hand wheel 32 coupled to a steering shaft 34. It should be noted that the use of a hand wheel is merely exemplary, as the steering system 14 can include any suitable user input device for steering the vehicle 10, including, but not limited to, a joystick, the hand wheel 32, etc. In one exemplary embodiment, the steering system 14 comprises an electric power steering (EPS) system, which can include a steering assist unit 36. The steering assist unit 36 is coupled to the steering shaft 34 of the steering system 14 and to tie rods 38, 40 of the vehicle 10. The steering assist unit 36 includes, for example, a rack and pinion steering mechanism (not shown) that is coupled through the steering shaft 34 to a steering actuator motor and gearing. During operation, as the hand wheel 32 is turned by a vehicle operator, a motor of the steering assist unit 36 provides the assistance to move the tie rods 38, 40, which in turn moves steering knuckles 42, 44, respectively. The steering knuckles 42, 44 are coupled to the respective wheels 30 of the vehicle 10. Although an EPS system is illustrated in FIG. 1 and described herein, it is appreciated that the steering system 14 can include various controlled steering systems such as steering systems with hydraulic configurations, steer by wire configurations, non-assisted steering systems, etc. The steering assist unit 36 is in communication with the control module 24 through a suitable communication architecture or arrangement that facilitates transfer of data, commands, power, etc. to provide the control module 24 with an angle of the hand wheel 32.

The driver communication system 16 displays data for the driver and occupants of the vehicle 10, and also receives input from the driver and occupants of the vehicle 10. In one example, the driver communication system 16 comprises an infotainment system, and includes a display 46 and an input device 48. The display 46 can be implemented as a flat panel display in an instrument panel or console of the vehicle 10. Those skilled in the art realize other techniques to implement the display 46 in the vehicle 10. The display 46 comprises any suitable technology for displaying information, including, but not limited to, a liquid crystal display (LCD), organic light emitting diode (OLED), plasma, or a cathode ray tube (CRT). The display 46 includes the input device 48, which receives inputs from the driver and/or occupant of the vehicle 10, to manipulate the movable hitch system 22, as will be discussed herein. The input device 48 can be implemented as a keyboard (not separately shown), a microphone (not separately shown), a touchscreen layer associated with the display 46, or other suitable device to receive data and/or commands from the user. Of course, multiple input devices 48 can also be utilized. For example, at least one input device 47 can be coupled to the hand wheel 32. The input device 47 can also enable the driver and/or occupant to manipulate the movable hitch system 22, as will be discussed in greater detail herein. The display 46, input device 48 and input device 47 are in communication with the control module 24 over a suitable communication architecture or arrangement that facilitates transfer of data, commands, power, etc.

In various embodiments, the driver communication system 16 includes a remote input device 49. The remote input device 49 includes keys or buttons 49', through which input can be received by a user and transmitted via an antenna 49" to an antenna 24' of the control module 24. The input received from the remote input device 49 can be used by the control module 24 to control the operation of the movable hitch system 22. It should be noted that the remote input device 49 illustrated herein is merely exemplary, as the remote input device can comprise an input received from a remote software application, such as an application running on a cellular phone, tablet, personal computer, etc.

The camera 18 is coupled to the vehicle 10, and in one example, is a rear vision camera, which provides the driver and/or occupants with image data or an image data stream captured when the transmission 28 is in the reverse range. Generally, the camera 18 comprises any suitable camera capable of capturing image data or an image data stream, as known to those skilled in the art. The camera 18 is in communication with the control module 24 through a communication architecture or arrangement that facilitates transfer of data, commands, power, etc. to transmit the image data or image data stream to the control module 24 for use in controlling the movable hitch system 22 and for display on the display 46.

The one or more sensors 20 include a vehicle yaw rate sensor 20' and a vehicle speed sensor 20". The one or more sensors 20 are in communication with the control module 24 over a suitable communication architecture or arrangement that facilitates transfer of data, commands, power, etc. The vehicle yaw rate sensor 20' measures and observes an angular velocity of the vehicle 10 around a vertical axis of the vehicle 10, as is generally known, and generates sensor signals based thereon. The vehicle speed sensor 20" measures and observes a speed of the vehicle 10, and in one example, the vehicle speed sensors 20" measure and observe a speed of an axle of the vehicle 10, and generates sensor signals based thereon. It should be noted that while the vehicle speed sensor 20" is illustrated herein as being associated with measuring and observing a speed of a rear axle, alternatively, the vehicle speed sensor 20" can measure and observe a speed of a front axle of the vehicle 10 and generate sensor signals based thereon, and furthermore, the speed of the vehicle 10 can be inferred from a speed of the engine 26 or determined by modeling, for example.

The movable hitch system 22 is coupled to the vehicle 10, and is generally disposed at a rear area 45 of the vehicle 10. Generally, the movable hitch system 22 is coupled to a frame of the vehicle 10 at the rear area 45, to enable the vehicle 10 to tow the trailer 8. In one example, the movable hitch system 22 includes a hitch frame 51, a first or fixed rail 50, a second or driven rail 52, a saddle 54, a receiver 56 and a motor 58. As will be discussed in greater detail herein, the motor 58 receives one or more control signals from the control module 24 to drive the driven rail 52 to move the saddle 54, and thus, the receiver 56 relative to the hitch frame 51 and the rear area 45 of the vehicle 10. The movement of the receiver 56 relative to the hitch frame 51 enables easier alignment of the receiver 56 with the tongue 6 of the trailer 8, and when the receiver 56 is engaged with the tongue 6 of the trailer 8, enables the trailer 8 to move in better correlation with the movement of the vehicle 10.

The hitch frame 51 is coupled to the frame of the vehicle 10. In one example, the hitch frame 51 is substantially U-shaped, however, the hitch frame 51 can have any suitable shape or configuration that enables movement of the receiver 56. In this example, the hitch frame 51 includes a cross-member 60, a first support member 62 and a second support member 64. The cross-member 60, first support member 62 and second support member 64 can be composed of any suitable material, such as a metal or metal alloy. The cross-member 60 extends substantially perpendicular to a longitudinal axis 66 of the vehicle 10. The cross-member 60 includes a first end 68 opposite a second end 70. The first support member 62 is coupled to the first end 68, and extends away from the cross-member 60 in a direction substantially parallel to the longitudinal axis 66 of the vehicle 10. The second support member 64 is coupled to the second end 70, and extends away from the cross-member 60 in a direction substantially parallel to the longitudinal axis 66 of the vehicle 10. The cross-member 60, first support member 62 and second support member 64 cooperate to support the movable hitch system 22 at the rear area 45 of the vehicle 10. In one example, each of the first support member 62 and the second support member 64 include a brace 72, which supports and is coupled to the fixed rail 50 and driven rail 52. It should be noted that the brace 72 is merely exemplary, and that the hitch frame 51 need not include the braces 72.

The fixed rail 50 is fixedly coupled to the brace 72 of the first support member 62 and the brace 72 of the second support member 64 so as to extend between the first support member 62 and second support member 64 in a direction substantially perpendicular to the longitudinal axis 66. In one example, the fixed rail 50 is fixedly coupled to the braces 72 via brackets 73. The fixed rail 50 comprises a stationary rail, which guides and supports the movement of the saddle 54. In other words, the fixed rail 50 does not move and is not driven. It should be noted that the use of the fixed rail 50 is merely exemplary, as the movement of the saddle 54 can be guided and supported through any suitable device, and can be solely supported by the driven rail 52, if desired.

The driven rail 52 is movably coupled to the brace 72 of the first support member 62 and to the motor 58. Generally, the driven rail 52 extends between the first support member 62 and the motor 58 in a direction substantially perpendicular to the longitudinal axis 66 and substantially parallel to the fixed rail 50. The driven rail 52 is movably coupled to the first support member 62 via a bracket 74, however, the driven rail 52 can be movably coupled to the first support member 62 via any suitable technique. In one example, the driven rail 52 comprises an output shaft of the motor 58, and includes a plurality of threads 76. The plurality of threads 76 are defined along an exterior surface of the driven rail 52 substantially over an entirety of a length of the driven rail 52. As will be discussed herein, upon receipt of the one or more control signals from the control module 24, the motor 58 rotates the driven rail 52 to move the saddle 54, and thus, the receiver 56 relative to the hitch frame 51.

The saddle 54 is coupled to the fixed rail 50 and the driven rail 52. The saddle 54 includes a first end 78 and a second end 80. The first end 78 defines a first bore 82, a second bore 84 and includes a lock 86. The first bore 82 is sized and shaped for coupling the receiver 56 to the saddle 54. The first bore 82 is generally defined so as to be substantially parallel to the longitudinal axis 66 of the vehicle 10. The second bore 84 is defined through the saddle 54, in a direction substantially perpendicular to the longitudinal axis 66 of the vehicle 10. The second bore 84 includes a plurality of threads 84', which are sized and shaped to meshingly engage with the plurality of threads 76 of the driven rail 52. The engagement between the plurality of threads 84' of the saddle 54 and the plurality of threads 76 of the driven rail 52 enable the movement or rotation of the driven rail 52 to move or linearly translate the saddle 54 relative to the hitch frame 51. The lock 86 secures the receiver 56 to the saddle 54 such that the receiver 56 is centered in the first bore 82, as is generally known in the art. In one example, the lock 86 can comprise a cotter pin, however, any suitable technique can be employed to fixedly secure the receiver 56 to the saddle 54 so as to be centered within the first bore 82. The second end 80 of the saddle 54 defines a third bore 88. The third bore 88 is sized and shaped to enable the fixed rail 50 to be slidably received through the third bore 88.

The receiver 56 includes a ball 90 and a support 92, as known to one of ordinary skill in the art. The ball 90 has a conventional diameter for mating with the tongue 6 of the trailer 8, and is fixedly mounted to a top surface of the support 92. The support 92 is sized and shaped to be received within the first bore 82 of the saddle 54, and secured with the lock 86.

The motor 58 is coupled to the brace 72 and the driven rail 52. In one example, the motor 58 is a servomotor, which includes a sensor 59 for position feedback. Based on the receipt of the one or more control signals from the control module 24, the motor 58 generates a torque, which is applied to the driven rail 52 to move or rotate the driven rail 52. The movement of the driven rail 52 moves or linearly translates the saddle 54, and thus, the receiver 56, relative to the hitch frame 51. In this example, the motor 58 moves the receiver 56 in a direction substantially perpendicular to the longitudinal axis 66 of the vehicle 10. The motor 58 also serves to maintain the location of the saddle 54 on the driven rail 52, and thus, the motor 58 transmits a value of the motor current to the control module 24 over a communication architecture or arrangement that facilitates transfer of data, commands, power, etc. Based on the value of the motor current, the control module 24 determines a force acting on the ball 90 of the receiver 56. It should be noted that the use of a servomotor is merely exemplary, as any suitable motor with a separate position sensor can be employed to move the saddle 54 relative to the hitch frame 51.

It should be noted that the movable hitch system 22 illustrated in FIG. 1 is merely exemplary, as a system to move the receiver 56 relative to the hitch frame 51 can be implemented in various ways. For example, with reference to FIG. 2, a movable hitch system 22' is shown. As the movable hitch system 22' is similar to the movable hitch system 22 of FIG. 1, the same reference numerals will be used to denote the same or similar components. Generally, the movable hitch system 22' is coupled to a frame of the vehicle 10 at the rear area 45, to enable the vehicle 10 to tow the trailer 8. In one example, the movable hitch system 22' includes a hitch frame 51', a receiver 56', a pivot 94 and a motor 58'. As will be discussed in greater detail herein, the motor 58' receives one or more control signals from the control module 24 to move the receiver 56' relative to the hitch frame 51' and the rear area 45 of the vehicle 10. The movement of the receiver 56' relative to the hitch frame 51' enables easier alignment of the receiver 56' with the tongue 6 of the trailer 8, and when the receiver 56' is engaged with the tongue 6 of the trailer 8, enables the trailer 8 to move in better correlation with the movement of the vehicle 10.

The hitch frame 51' is coupled to the frame of the vehicle 10. In one example, the hitch frame 51' is substantially U-shaped, however, the hitch frame 51' can have any suitable shape or configuration that enables movement of the receiver 56'. In this example, the hitch frame 51' includes the cross-member 60, a first support member 62' and a second support member 64'. The cross-member 60, first support member 62' and second support member 64' can be composed of any suitable material, such as a metal or metal alloy. The first support member 62' is coupled to the first end 68, and extends away from the cross-member 60 in a direction substantially parallel to the longitudinal axis 66 of the vehicle 10. The second support member 64' is coupled to the second end 70, and extends away from the cross-member 60 in a direction substantially parallel to the longitudinal axis 66 of the vehicle 10. The cross-member 60, first support member 62' and second support member 64' cooperate to support the movable hitch system 22' at the rear area 45 of the vehicle 10.

The receiver 56' includes the ball 90 and a support 92'. The ball 90 is fixedly mounted to a top surface of the support 92' at a first end 96 of the support 92'. The support 92' includes a first bore 98 and a second bore 100. The first bore 98 is defined through the support 92' at a second end 102, and receives a coupling device, such as a pin 104, to pivotably couple the support 92' to the pivot 94. The second bore 100 is defined through the support 92' between the first end 96 and the second end 102. The second bore 100 receives a suitable mechanical fastener 106 to fixedly couple an output shaft 108 of the motor 58' to the support 92'.

The pivot 94 is coupled to the cross-member 60. The pivot 94 serves as a pivot point for the receiver 56' to enable the receiver 56' to move relative to the hitch frame 51'. The pivot 94 defines a bore 94' for receipt of the pin 104.

The motor 58' is coupled to the cross-member 60 of the hitch frame 51' via a pin to allow for a rotational degree of freedom for the servo mechanism associated with the motor 58'. The motor 58' includes the output shaft 108, which is fixedly coupled to the support 92'. In one example, the motor 58' is a servomotor, which includes the sensor 59 for position feedback. Based on the receipt of the one or more control signals from the control module 24, the motor 58' generates a torque, which is translated into linear motion via suitable gearing such that the linear motion of the output shaft 108 moves or pivots the support 92', and thus, the ball 90, relative to a centerline of the vehicle 10. In this example, the motor 58' pivots the receiver 56' in a direction substantially transverse to the longitudinal axis 66 of the vehicle 10. The motor 58' also serves to maintain the location of the support 92' relative to the hitch frame 51', and thus, the motor 58' transmits a value of the motor current to the control module 24 over a communication architecture or arrangement that facilitates transfer of data, commands, power, etc. Based on the value of the motor current, the control module 24 determines a force acting on the receiver 56'. It should be noted that the use of a servomotor is merely exemplary, as any suitable motor with a separate position sensor can be employed to move the support 92' relative to the hitch frame 51'.

Figure 2:
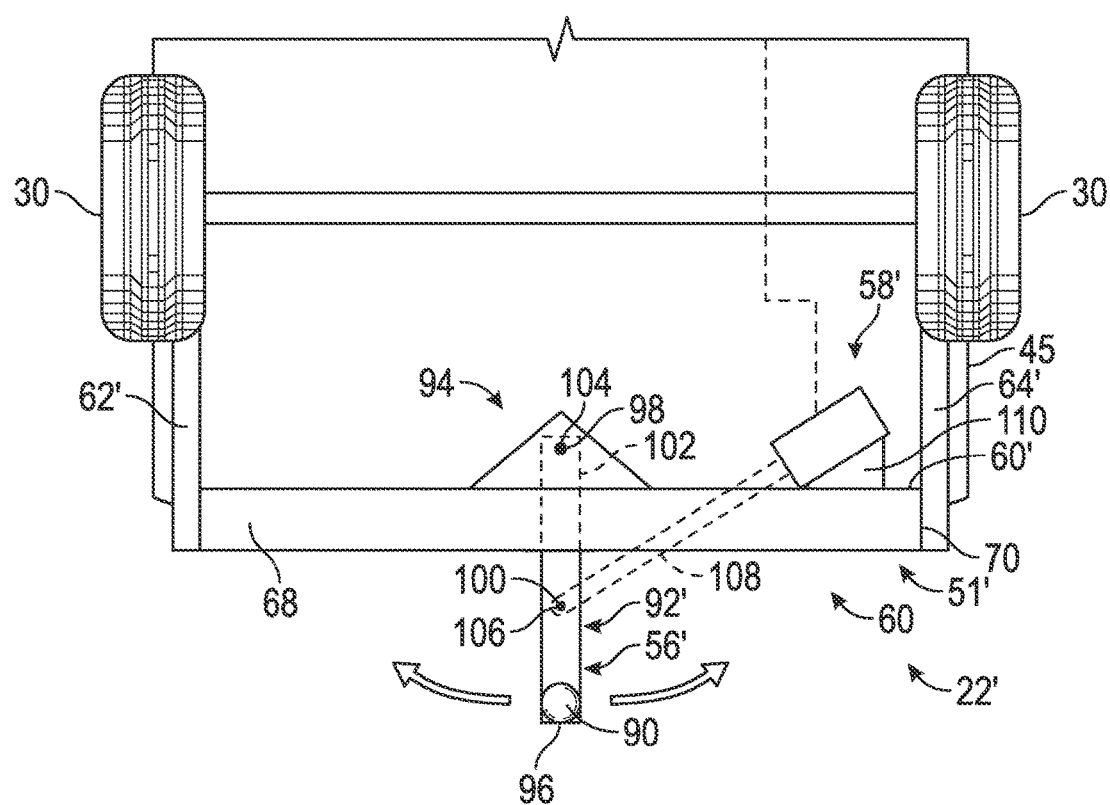
FIG. 2 is a functional block diagram illustrating a movable hitch receiver system for a vehicle in accordance with various embodiments.

In various embodiments, with reference to FIGS. 1 and 2, the control module 24 outputs one or more control signals to the motor 58, 58' of the movable hitch system 22, 22' based on one or more of the sensor signals and input from the input devices 47, 48, 49, and further based on the movable hitch systems and methods of the present disclosure, to move the receiver 56, 56' relative to the hitch frame 51, 51'. As will be discussed, the control module 24 outputs the one or more control signals to the motor 58, 58' based on the sensor signals from the at least one sensor 20, input data from the input devices 47, 48, 49 and range data from the transmission 28. The control module 24 outputs the one or more control signals to the motor 58, 58' based on the input data from the input devices 47, 48, 49, range data from the transmission 28 and camera image data from the camera 18. The control module 24 outputs the one or more control signals to the motor 58, 58' based on the sensor signals from the at least one sensor 20 and input data from the input devices 47, 48, 49. The control module 24 also outputs one or more control signals to the steering assist unit 36 and the transmission 28 to move the vehicle 10 based on input data from the input devices 47, 48, 49, range data from the transmission 28 and camera image data from the camera 18.

Figure 3:
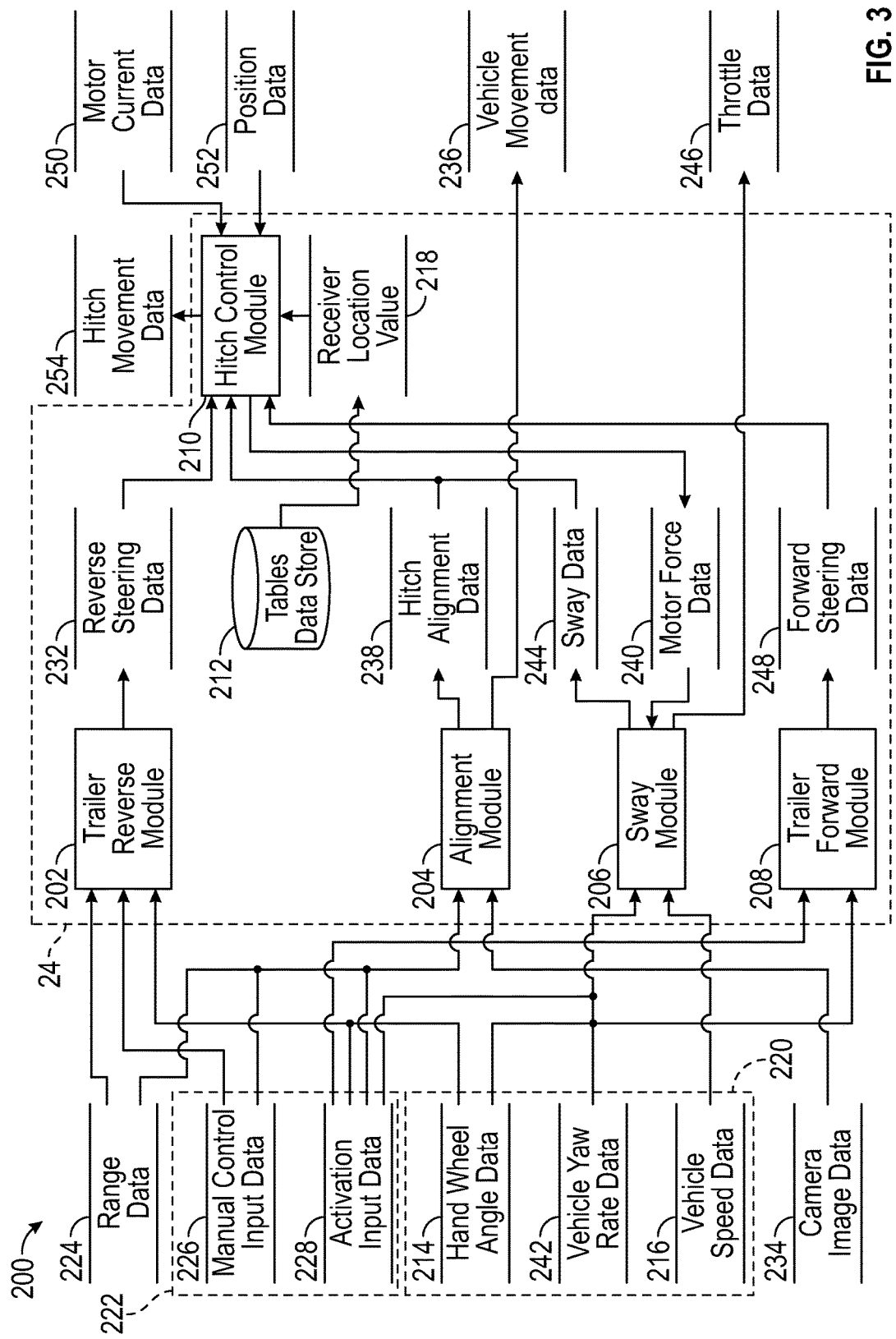
FIG. 3 is a dataflow diagram illustrating a control system of the movable hitch receiver system in accordance with various embodiments.

Referring now to FIG. 3, and with continued reference to FIGS. 1 and 2, a dataflow diagram illustrates various embodiments of a control system 200 for the movable hitch system 22, 22' (FIGS. 1 and 2) that may be embedded within the control module 24. Various embodiments of the control system according to the present disclosure can include any number of sub-modules embedded within the control module 24. As can be appreciated, the sub-modules shown in FIG. 3 can be combined and/or further partitioned to similarly control the movement of the receiver 56, 56' and output one or more control signals to the motor 58, 58' based on the signals from the at least one sensor 20, input data from the input devices 47, 48, 49, range data from the transmission 28 and camera image data from the camera 18 (FIGS. 1 and 2). Inputs to the system can be sensed from the vehicle 10 (FIG. 1), received from other control modules (not shown), and/or determined/modeled by other sub-modules (not shown) within the control module 24. In various embodiments, the control module 24 includes a trailer reverse module 202, an alignment module 204, a sway module 206, a trailer forward module 208, a hitch control module 210 and a tables datastore 212.

The tables datastore 212 stores one or more tables (e.g., lookup tables) that indicate a location for the receiver 56, 56' (e.g. a desired location for the receiver 56, 56' relative to the hitch frame 51, 51') based on hand wheel angle data 214 from the steering assist unit 36 and vehicle speed data 216 from the vehicle speed sensors 20". In other words, the tables datastore 212 stores one or more tables that provide a location for the receiver 56, 56' relative to the hitch frame 51, 51' based on various angles of the hand wheel at various speeds of the vehicle 10. The one or more tables comprise calibration tables, which are acquired based on experimental data, and in one example, can comprise at least one table for forward motion of the vehicle 10 and at least one table for rearward motion of the vehicle 10. In various embodiments, the tables can be interpolation tables that are defined by one or more indexes. A receiver location value 218 provided by at least one of the tables indicates a location value for the receiver 56, 56' on the hitch frame 51, 51' to aid in steering an attached trailer 8 based on the hand wheel angle and the vehicle speed. As an example, one or more tables can be indexed by parameters such as, but not limited to, hand wheel angle or vehicle speed, to provide the receiver location value 218.

The trailer reverse module 202 receives as input sensor data 220 from the at least one sensor 20, input data 222 from one or more of the input devices 47, 48, 49, and range data 224 from the transmission 28. In various embodiments, sensor data 220 includes hand wheel angle data 214 from the steering assist unit 36 and vehicle speed data 216 from the vehicle speed sensors 20". In various embodiments, the input data 222 comprises manual control input data 226 and activation input data 228. The manual control input data 226 includes input received from the input devices 47, 48, 49 for the movement of the receiver 56, 56'. For example, the manual control input data 226 comprises an input to move the receiver 56, 56' to the left or to the right relative to the hitch frame 51, 51'. The activation input data 228 includes input received to activate the control system for the movable hitch system 22, 22'. In other words, the movable hitch system 22, 22' is operable in a manual mode in which a driver or operator manually moves the receiver 56, 56' relative to the hitch frame 51, 51' (based on the receipt of manual control input data 226) or an automatic or autonomous mode (based on receipt of the activation input data 228), in which the control module 24 moves the receiver 56, 56' based on the systems and methods described herein. The range data 224 includes a current range of the transmission 28, including, but not limited to, a park range, a reverse range, a neutral range and a drive range.

The trailer reverse module 202 sets reverse steering data 232 for the hitch control module 210 based on the sensor data 220, the input data 222 and the range data 224. In various embodiments, the trailer reverse module 202 receives range data 224 that indicates the current range of the transmission 28. Based on the range data 224 indicating that the transmission 28 is in the reverse range, the trailer reverse module 202 determines if manual control input data 226 has been input to at least one of the input devices 47, 48, 49. If no manual control input data 226 has been received, the trailer reverse module 202 determines if activation input data 228 has been received. Based on the receipt of activation input data 228, the trailer reverse module 202 determines if the hand wheel angle data 214 has changed. If the hand wheel angle data 214 has changed, indicating a turning event associated with the vehicle 10, and thus, the trailer 8 attached to the receiver 56, 56', then the trailer reverse module 202 sets the reverse steering data 232 for the hitch control module 210 that indicates the angle of the hand wheel and the speed of the vehicle 10 during the steering event.

The alignment module 204 receives as input range data 224, input data 222, and camera image data 234. The camera image data 234 comprises image data or an image data stream from the camera 18. In various embodiments, the alignment module 204 determines if activation input data 228 is received from at least one of the input devices 47, 48, 49. Based on the receipt of activation input data 228, the alignment module 204 outputs vehicle movement data 236. The vehicle movement data 236 comprises one or more control signals for the transmission 28 to be placed into the reverse range, and one or more control signals for the steering assist unit 36 to steer the vehicle 10 into alignment with the trailer 8 based on the image of the trailer 8 detected in the camera image data 234. The trailer 8 can be detected in the camera image data 234 through any suitable technique known to one skilled in the art. As the autonomous rearward movement of a vehicle may be generally known in the art, specifics of the automated rearward movement of the vehicle 10 will not be discussed in great detail herein. In various embodiments, the alignment module 204 outputs the vehicle movement data 236 to enable one or more of the systems of the vehicle 10 to move the vehicle 10 into alignment with the trailer 8 positioned behind or rearward of the vehicle 10 based on the camera image data 234.

In various embodiments, based on the range data 224, input data 222, and camera image data 234, the alignment module 204 sets hitch alignment data 238 for the hitch control module 210. The hitch alignment data 238 indicates a position for the receiver 56, 56' to enable the ball 90 to engage with the tongue 6 of the trailer 8. Based on the activation input data 228 received from at least one of the input devices 47, 48, 49, the alignment module 204 determines the position for the receiver 56, 56' so that the ball 90 engages with the tongue 6 of the trailer 8 based on a location of the tongue 6 of the trailer 8 in the camera image data 234. Stated another way, the alignment module 204 sets the hitch alignment data 238 to provide the hitch control module 210 with the position for the receiver 56, 56' to enable coupling of the ball 90 with the tongue 6 of the trailer 8 based on the camera image data 234. This enables easy coupling of the trailer 8 to the vehicle 10, and reduces customer frustration. It should be noted that the displacement of the receiver 56, 56' can also be based on a position error associated with the position of the ball 90, for example, a lateral displacement difference of the ball 90 from a current location of the ball 90 to a centerline of the tongue 6 of the trailer 8.

In various embodiments, based on the input data 222, the alignment module 204 sets hitch alignment data 238 for the hitch control module 210. In this example, the alignment module 204 sets the hitch alignment data 238 based on the receipt of manual control input data 226 from at least one of the input devices 47, 48, 49.

The sway module 206 receives as input sensor data 220, input data 222, and motor force data 240. The motor force data 240 is received as input from the hitch control module 210, and indicates an amount of force acting on the receiver 56, 56', which is calculated as a direct function of motor feedback current. In various embodiments, the sway module 206 receives vehicle yaw rate data 242 from the vehicle yaw rate sensor 20', hand wheel angle data 214 from the steering assist unit 36, vehicle speed data 216 from the vehicle speed sensors 20" and activation input data 228 from at least one of the input devices 47, 48, 49. The sway module 206 determines if a difference between the vehicle yaw rate measured and observed by the vehicle yaw rate sensor 20' and a desired yaw rate is greater than a first threshold for the vehicle yaw rate, determines if the hand wheel angle is less than a second threshold for the steering wheel angle, determines if the motor force data 240 is greater than a third threshold for the force acting on the receiver 56, 56' and determines if the vehicle speed is greater than a fourth threshold for the speed of the vehicle 10. In one example, the desired yaw rate error is about 1.0 degrees/second to about 5.0 degrees/second. It should be understood that the above threshold values for the vehicle yaw rate, steering wheel angle, force acting on the receiver and speed of the vehicle can vary based on the size and type of the vehicle 10 and the type of trailers 8 the vehicle 10 is capable or rated to tow.

If true, the sway module 206 activates the trailer sway control to reduce the likelihood of trailer sway, and sets sway data 244 for the hitch control module 210 and vehicle throttle data 246 for the engine control module 26' associated with the engine 26 of the vehicle 10. The sway data 244 indicates a location for the receiver 56, 56' relative to the hitch frame 51, 51' to reduce trailer sway.

In one example, the sway data 244 indicates the location for the receiver 56, 56' to ensure that a difference between the vehicle yaw rate and a desired vehicle yaw rate is less than a fifth threshold. It should be understood that the fifth threshold values can vary based on the size and type of the vehicle 10 and the type of trailers 8 the vehicle 10 is capable or rated to tow. The throttle data 246 indicates a throttle position for the engine control module 26' to control the speed of the engine 26, and thus, the vehicle 10, to reduce trailer sway. The sway module 206 determines if the difference between the vehicle yaw rate and the desired vehicle yaw rate is less than the fifth threshold and the motor force data 240 is less than a sixth threshold, for a specified time length, which is dependent on the filter yaw rate error signal, which can be obtained from the sensor data 220. If true, the sway module 206 deactivates the trailer sway control.

The trailer forward module 208 receives as input the sensor data 220, the input data 222 and the range data 224. In various embodiments, the trailer forward module 208 receives as input the hand wheel angle data 214 from the steering assist unit 36 and the activation input data 228 from at least one of the input devices 47, 48, 49. Based on the receipt of activation input data 228, the trailer forward module 208 determines if the range of the transmission 28 is in the drive range from the range data 224. If the transmission 28 is in the drive range, the trailer forward module 208 determines if the hand wheel angle data 214 is greater than or equal to a seventh threshold, such as about 30 to about 180 degrees. If the hand wheel angle data 214 is greater than or equal to the seventh threshold, the trailer forward module 208 sets forward steering data 248 for the hitch control module 210. The forward steering data 248 indicates a position for the receiver 56, 56' relative to the hitch frame 51, 51' so that the trailer 8 attached to the vehicle 10 is further to the outside of the vehicle 10, for maneuvering around corners or curves, for example. In one example, the forward steering data 248 indicates the position for the receiver 56, 56' based on the difference between the hand wheel angle data 214 and the seventh threshold, multiplied by a gain. In one example, the gain can be determined from a look-up table. In this example, the gain can be determined based on the difference between the hand wheel angle data 214 and the seventh threshold, and the vehicle velocity and hand wheel angle change rate.

The hitch control module 210 receives as input the reverse steering data 232, hitch alignment data 238, sway data 244, forward steering data 248, motor current data 250 and position data 252. The motor current data 250 indicates a current of the motor 58, 58'. Based on the motor current data 250, the hitch control module 210 determines the force acting on the receiver 56, 56' and sets the motor force data 240 for the sway module 206. In this regard, the current of the motor 58, 58' indicates an amount of torque required to maintain the location of the receiver 56, 56' which correlates to the amount of force acting on the ball 90 of the receiver 56, 56' from the trailer 8. The position data 252 indicates a current position of the receiver 56, 56' relative to the hitch frame 51, 51' as measured and observed by the sensor 59.

In various embodiments, based on the reverse steering data 232, the hitch control module 210 queries the tables datastore 212 for the receiver location value 218. Based on the receiver location value 218 and the position data 252, the hitch control module 210 outputs hitch movement data 254 to the motor 58, 58'. The hitch movement data 254 comprises an amount of movement for the motor 58, 58' (e.g. number of rotations of the motor 58 or amount of translation for motor 58') to move the receiver 56, 56' from the current position of the receiver 56, 56' (from the position data 252) to a desired position of the receiver 56, 56' (from the receiver location value 218).

In various embodiments, based on the hitch alignment data 238 and the position data 252, the hitch control module 210 outputs the hitch movement data 254 to the motor 58, 58'. The hitch movement data 254 comprises an amount of movement for the motor 58, 58' to move the receiver 56, 56' from the current position of the receiver 56, 56' (from the position data 252) to a desired position of the receiver 56, 56' (from the hitch alignment data 238).

In various embodiments, based on the sway data 244 and the position data 252, the hitch control module 210 outputs the hitch movement data 254 to the motor 58, 58'. The hitch movement data 254 comprises an amount of movement for the motor 58, 58' to move the receiver 56, 56' from the current position of the receiver 56, 56' (from the position data 252) to a desired position of the receiver 56, 56' (from the sway data 244).

In various embodiments, based on the forward steering data 248 and the position data 252, the hitch control module 210 outputs the hitch movement data 254 to the motor 58, 58'. The hitch movement data 254 comprises an amount of movement for the motor 58, 58' to move the receiver 56, 56' from the current position of the receiver 56, 56' (from the position data 252) to a desired position of the receiver 56, 56' (from the forward steering data 248).

Referring now to FIGS. 4-7, and with continued reference to FIGS. 1-3, flowcharts illustrate a control method that can be performed by the control module 24 of FIG. 1 in accordance with the present disclosure. As can be appreciated in light of the disclosure, the order of operation within the method is not limited to the sequential execution as illustrated in FIGS. 4-7, but may be performed in one or more varying orders as applicable and in accordance with the present disclosure.

In various embodiments, the method can be scheduled to run based on predetermined events, and/or can run continually during operation of the vehicle 10.

Figure 4:
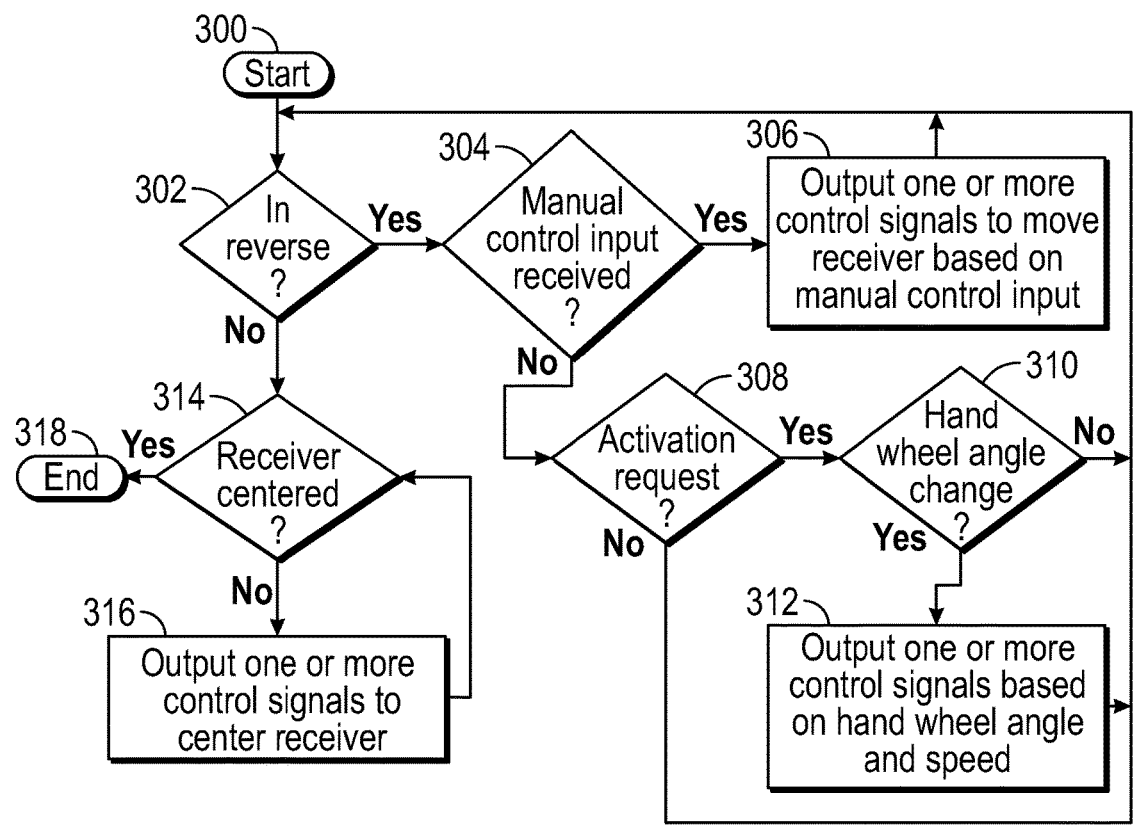
FIG. 4 is a flowchart illustrating a control method of the movable hitch receiver system in accordance with various embodiments.

With reference to FIG. 4, a method for moving the movable hitch system 22, 22' during a reverse steering maneuver is shown. The method begins at 300. At 302, the method determines if the transmission 28 is in the reverse range based on the range data 224. If the transmission 28 is in the reverse range, at 304, the method determines if manual control input data 226 has been received from one of the input devices 47, 48, 49. If manual control input data 226 has been received, at 306 the method outputs one or more control signals to the motor 58, 58' to move the receiver 56, 56' relative to the hitch frame 51, 51' based on the manual control input data 226.

Otherwise, if manual control input data 226 is not received, at 308, the method determines if an activation request has been received (activation input data 228). If no activation request has been received from at least one of the input devices 47, 48, 49, the method loops to 302. If an activation request has been received, the method, at 310, determines if there has been a change in the hand wheel angle based on the hand wheel angle data 214 from the steering assist unit 36. If the hand wheel angle is the same, the method loops to 302. Otherwise, the method, at 312, outputs one or more control signals to the motor 58, 58' to move the receiver 56, 56' relative to the hitch frame 51, 51' based on the receiver location value 218 and the position data 252.

If, at 302, the transmission 28 is not in the reverse range, the method proceeds to 314. At 314, the method determines if the receiver 56, 56' is centered relative to the hitch frame 51, 51' based on the position data 252. If the receiver 56, 56' is not centered, at 316, the method outputs one or more control signals to the motor 58, 58' to move the receiver 56, 56' to the centered position based on the position data 252. The method loops until the receiver 56, 56' is centered. Once the receiver 56, 56' is centered, the method ends at 318.

Figure 5:
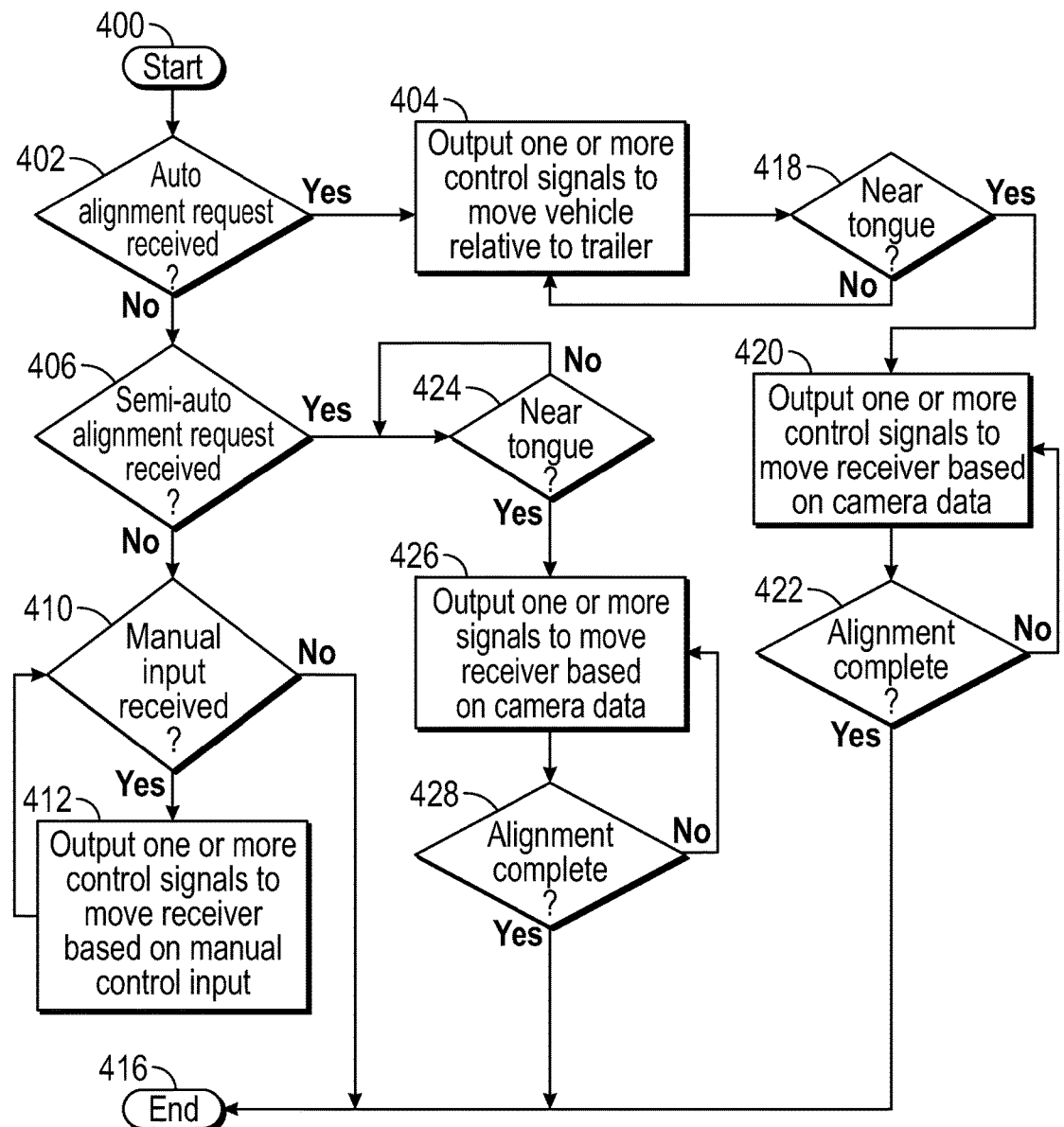
FIG. 5 is a flowchart illustrating a control method of the movable hitch receiver system in accordance with various embodiments.

With reference to FIG. 5, a method for aligning the vehicle 10 with the trailer 8 is shown. The method begins at

400. At 402, the method determines if activation input data 228 is received from one of the input devices 47, 48, 49 to autonomously align the vehicle 10 with the trailer 8 based on camera image data 234. If activation input data 228 is received for autonomous alignment, the method goes to 404. Otherwise, at 406, the method determines if activation input data 228 is received from one of the input devices 47, 48, 49 to semi-autonomously align the vehicle 10 with the trailer 8 based on camera image data 234. If activation input data 228 is received for semi-autonomous alignment, the method goes to 408. Otherwise, at 410, the method determines if manual control input data 226 is received from one of the input devices 47, 48, 49. If manual control input data 226 is received, at 412, the method outputs one or more control signals to the motor 58, 58' to move the receiver 56, 56' based on the manual control input data 226 and loops to 410.

If autonomous alignment of the vehicle 10 with the trailer 8 is requested, at 404, the method outputs one or more control signals to the steering assist unit 36 and the transmission 28 to move the vehicle 10 relative to the trailer 8 based on the camera image data 234. At 418, the method determines if the receiver 56, 56' of the vehicle 10 is near the tongue 6 of the trailer 8 based on the camera image data 234. If true, the method proceeds to 420. Otherwise, the method loops to 404.

At 420, the method outputs one or more control signals to the motor 58, 58' to move the receiver 56, 56' based on the position data 252 and the hitch alignment data 238. At 422, the method determines if the alignment of the ball 90 of the receiver 56, 56' with the tongue 6 of the trailer 8 is complete. If the alignment is complete, the method ends at 416. Otherwise, the method loops to 420.

If semi-autonomous alignment of the vehicle 10 with the trailer 8 is requested, at 424, the method determines if the receiver 56, 56' of the vehicle 10 is near the tongue 6 of the trailer 8 based on the camera image data 234. If true, the method proceeds to 426. Otherwise, the method loops to 424. At 426, the method outputs one or more control signals to the motor 58, 58' to move the receiver 56, 56' based on the position data 252 and the hitch alignment data 238. At 428, the method determines if the alignment of the ball 90 of the receiver 56, 56' with the tongue 6 of the trailer 8 is complete. If the alignment is complete, the method ends at 416. Otherwise, the method loops to 426.

Figure 6:
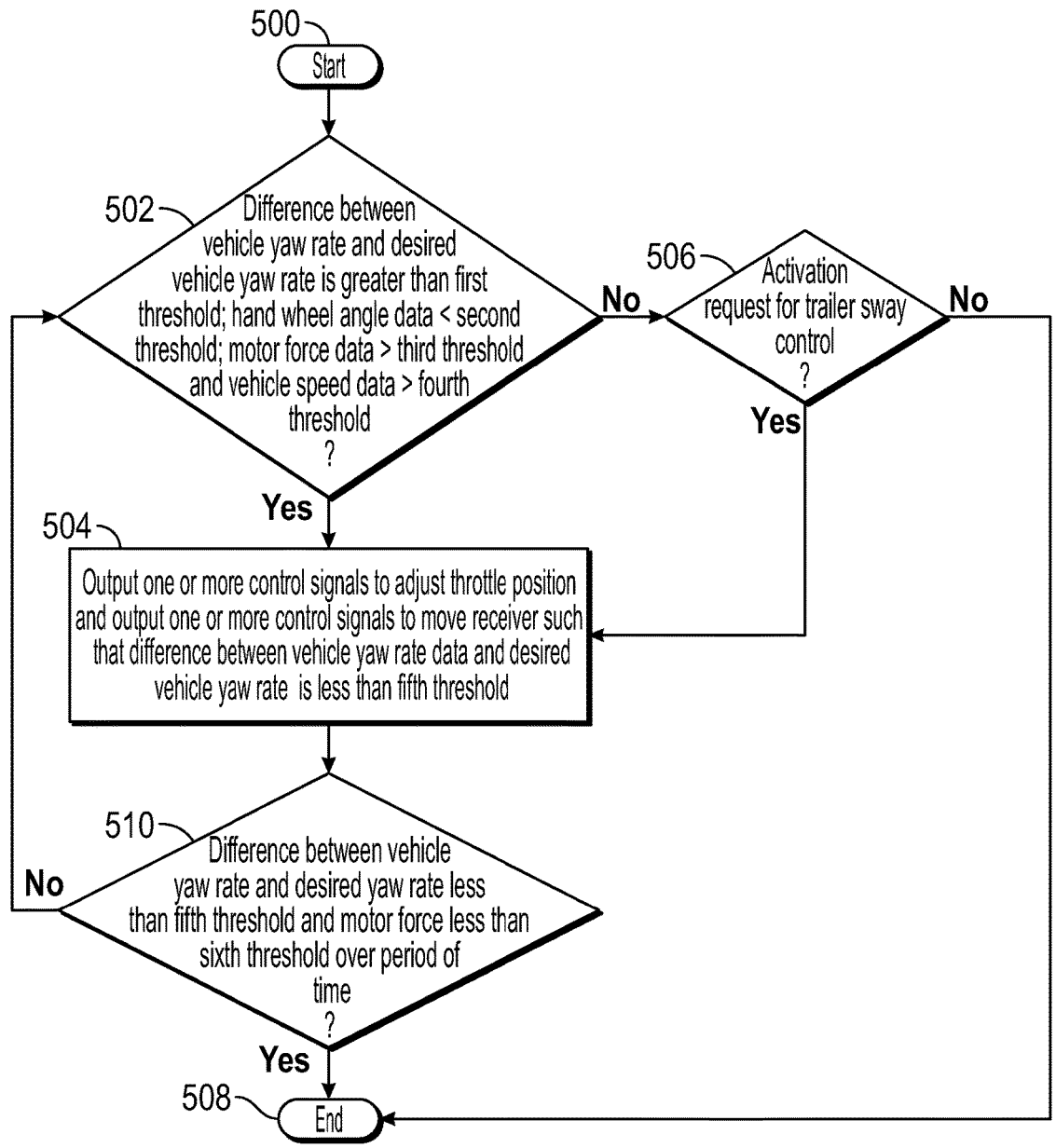
FIG. 6 is a flowchart illustrating a control method of the movable hitch receiver system in accordance with various embodiments.

With reference to FIG. 6, a method for controlling sway of the trailer 8 or trailer sway is shown. The method begins at 500. At 502, the method determines if the difference between the vehicle yaw rate data 242 and the desired vehicle yaw rate is greater than the first threshold; if the hand wheel angle data 214 is less than the second threshold; if the motor force data 240 is greater than the third threshold; and if the vehicle speed data 216 is greater than the fourth threshold. If true, the method goes to 504. Otherwise, at 506 the method determines if an activation request (activation input data 228) has been received from at least one of the input devices 47, 48, 49 to activate trailer sway control. If a request has been received, the method goes to 504. Otherwise, the method ends at 508.

At 504, the method outputs one or more control signals to the engine control module 26' to adjust the throttle of the engine 26 to reduce the speed of the vehicle 10 and outputs one or more control signals to the motor 58, 58' to move the receiver 56, 56' based on the sway data 244 and the position data 252. In one example, the one or more control signals are output to the engine control module 26' and the motor 58, 58' such that a difference between the vehicle yaw rate data 242 and the desired vehicle yaw rate is less than a fifth threshold.

At 510, the method determines if the difference between the vehicle yaw rate data 242 and the desired vehicle yaw rate is less than the fifth threshold; and the motor force data 240 is less than a sixth threshold, both over a predetermined time period. If true, the method ends at 508. Otherwise, the method loops to 502.

Figure 7:
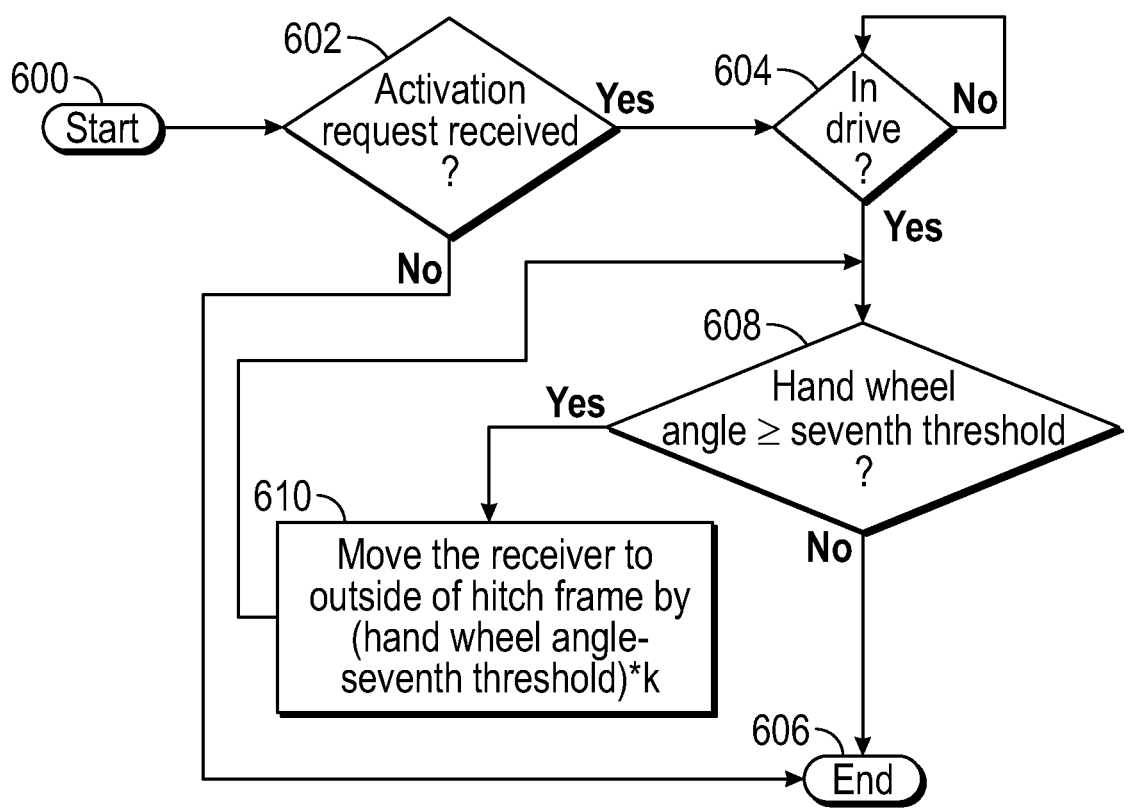
FIG. 7 is a flowchart illustrating a control method of the movable hitch receiver system in accordance with various embodiments.

With reference to FIG. 7, a method for controlling the movable hitch system 22, 22' during cornering is shown. The method begins at 600. At 602, the method determines if an activation request (activation input data 228) has been received from one of the input devices 47, 48, 49 to activate cornering control. If a request has been received, the method goes to 604. Otherwise, the method ends at 606. At 604, the method determines if the transmission 28 is in the drive range based on the range data 224. If the transmission 28 is in the drive range, the method proceeds to 608. Otherwise, the method loops.

At 608, the method determines if the hand wheel angle data 214 is greater than or equal to the seventh threshold. If true, at 610, the method outputs one or more control signals to the motor 58, 58' to move the receiver 56, 56' towards the outside of the hitch frame 51, 51' based on the forward steering data 248 and the position data 252 to assist in navigating the trailer 8 through the cornering maneuver. Otherwise, the method ends at 606.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of moving a receiver associated with a hitch frame of a vehicle, comprising:

receiving data indicating a current range of a transmission of the vehicle;

receiving sensor data indicating a current position of the receiver on the hitch frame;

controlling, by a processor, the receiver to a desired position based on a value of the current range;

wherein when the current range is other than a reverse range, determining, by the processor, the desired position to be a center position relative to a longitudinal axis of the vehicle and based on the current position of the receiver on the hitch frame, outputting one or more control signals to a motor coupled to the receiver to move the receiver relative to the longitudinal axis of the vehicle to the desired position; and wherein when the current range is the reverse range, determining, by the processor, the desired position based on a speed of the vehicle and a hand wheel angle, and based on a received activation input, retrieving, by the processor, from a look-up table stored in a datastore, the desired position for the receiver on the hitch frame based on the hand wheel angle and the speed of the vehicle, and outputting one or more control signals to the motor coupled to the receiver to move the receiver relative to the longitudinal axis of the vehicle to the desired position.

2. The method of claim 1, wherein the receiving data indicating the hand wheel angle further comprises:
receiving the hand wheel angle from a steering assist unit of the vehicle.

3. The method of claim 1, further comprising:
receiving manual input data from an input device indicating a user desired movement for the receiver; and
outputting one or more control signals to the motor based on the input data to move the receiver relative to the longitudinal axis of the vehicle.

4. The method of claim 1, wherein receiving input data further comprises:
receiving input data from an input device remote from the vehicle.

5. The method of claim 1, further comprising:
when the current range is the drive range, determining whether the hand wheel angle is greater than a fifth threshold, based on the determination that the hand wheel angle is greater than the fifth threshold, determining, by the processor, the desired position for the receiver based on a difference between the hand wheel angle and the fifth threshold, and outputting the one or more control signals to the motor to move the receiver to the desired position.

6. A vehicle, comprising:
an engine having an engine control module;
a movable hitch system including a receiver movably coupled to a hitch frame and a motor having an output shaft coupled to the receiver to move the receiver on the hitch frame;
a source of data that provides a hand wheel angle, a vehicle yaw rate, a force acting on the motor associated with the receiver and a vehicle speed;
a control module, having a processor, that:
determines the vehicle yaw rate is greater than a first threshold;
determines whether the hand wheel angle is less than a second threshold;
determines whether the force acting on the motor is greater than a third threshold;
determines whether the vehicle speed is greater than a fourth threshold; and
based on the determination that the vehicle yaw rate is greater than the first threshold, the hand wheel angle is less than the second threshold, the force acting on the motor is greater than the third threshold and the vehicle speed is greater than the fourth threshold, outputs a throttle position for the engine control module to control a speed of the engine and outputs one or more control signals to the motor to move the receiver on the hitch frame.

7. The vehicle of claim 6, further comprising:
a source of vehicle speed data that indicates a speed of the vehicle,
wherein the control module retrieves, from a look-up table stored in a datastore, a location for the receiver on the hitch frame based on the hand wheel angle and the vehicle speed data, and the control module outputs the one or more control signals to the motor to move the receiver on the hitch frame based on the retrieved location.

8. The vehicle of claim 6, further comprising a user input device that receives user input to manually move the receiver, wherein the control module outputs the one or more control signals to the motor to move the receiver on the hitch frame based on the user input.

9. The vehicle of claim 6, further comprising:
a source that indicates a current range of a transmission, wherein the control module:
when the current range is the drive range, determines whether the hand wheel angle is greater than a fifth threshold;
based on the determination that the hand wheel angle is greater than the fifth threshold, determines a position for the receiver on the hitch frame based on a difference between the hand wheel angle and the fifth threshold; and
outputs the one or more control signals to the motor to move the receiver on the hitch frame based on the determined position.

10. The vehicle of claim 6, wherein the receiver is movable in a direction substantially perpendicular to a longitudinal axis of the vehicle.

11. The vehicle of claim 6, wherein the source of user input is remote from the vehicle.

* * * * *